(12) United States Patent
Nakagawa et al.

(10) Patent No.: US 7,220,511 B2
(45) Date of Patent: May 22, 2007

(54) FUEL CELL

(75) Inventors: Takaki Nakagawa, Tochigi (JP); Hiroyuki Tanaka, Utsunomiya (JP); Takashi Kosaka, Utsunomiya (JP); Takahiro Yoshida, Utsunomiya (JP); Narutoshi Sugita, Utsunomiya (JP); Shuhei Goto, Utsunomiya (JP); Seiji Sugiura, Utsunomiya (JP); Tadashi Nishiyama, Tochigi-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 220 days.

(21) Appl. No.: 11/023,754

(22) Filed: Dec. 28, 2004

(65) Prior Publication Data
US 2005/0153192 A1 Jul. 14, 2005

(30) Foreign Application Priority Data
Jan. 14, 2004 (JP) ............................ 2004-006384

(51) Int. Cl.
H01M 8/02 (2006.01)

(52) U.S. Cl. ............................ 429/35; 429/34; 429/36

(58) Field of Classification Search ................. 429/35, 429/36, 30, 12, 13, 34
See application file for complete search history.

(56) References Cited

U.S. PATENT DOCUMENTS

2005/0074655 A1 * 4/2005 Ariyoshi et al. ............... 429/34
2005/0191537 A1 * 9/2005 Belchuk ....................... 429/35

FOREIGN PATENT DOCUMENTS

| JP | 11-339828 | 12/1999 |
| JP | 2003-115304 | 4/2003 |

\* cited by examiner

*Primary Examiner*—Patrick Joseph Ryan
*Assistant Examiner*—Monique Wills
(74) *Attorney, Agent, or Firm*—Fish & Richardson P.C.

(57) ABSTRACT

A fuel cell includes a membrane electrode assembly and first and second metal separators sandwiching the membrane electrode assembly. A first cell voltage terminal for detecting a voltage generated in the membrane electrode assembly is formed integrally with an outer region of the first metal separator. The first cell voltage terminal extends outwardly from the first metal separator. A first seal member covers the outer region of the first metal separator, and includes a first extension seal which covers the first cell voltage terminal to a position near a tip end of the first cell voltage terminal.

5 Claims, 6 Drawing Sheets

FUEL CELL

BACKGROUND OF THE INVENTION

1. Field of the Invention

The present invention relates to a fuel cell including a membrane electrode assembly and separators sandwiching the membrane electrode assembly. The membrane electrode assembly includes a pair of electrodes and an electrolyte membrane interposed between the electrodes.

2. Description of the Related Art

For example, a solid polymer fuel cell employs a polymer ion exchange membrane as a solid polymer electrolyte membrane. The solid polymer electrolyte membrane is interposed between an anode and a cathode to form a membrane electrode assembly. Each of the anode and the cathode is made of electrode catalyst and porous carbon. The membrane electrode assembly is sandwiched between separators (bipolar plates) to form the fuel cell.

In the fuel cell, a fuel gas such as a gas chiefly containing hydrogen (hereinafter also referred to as the hydrogen-containing gas) is supplied to the anode. The air or the like (hereinafter also referred to as the oxygen-containing gas) is supplied to the cathode. The catalyst of the anode induces a chemical reaction of the fuel gas to split the hydrogen molecule into hydrogen ions and electrons. The hydrogen ions move toward the cathode through the electrolyte membrane, and the electrons flow through an external circuit to the cathode, creating a DC electrical energy.

In operation of the fuel cell, typically, a voltage detection device is used to detect a cell voltage at the time of power generation for detecting whether the desired power generation performance is achieved or not. In relation to this operation, Japanese Laid-Open Patent Publication No. 11-339828 discloses a fuel cell stack equipped with a cell voltage measuring terminal.

According to the disclosure of Japanese Laid-Open Patent Publication No. 11-339828, the fuel cell stack includes a metal separator 1 as shown in FIG. 6. The separator 1 has an air supply passage 2a, a cooling water passage 3, a hydrogen supply passage 4a, an air discharge passage 2b, and a hydrogen discharge passage 4b. For example, a pin shaped voltage measuring terminal 6 is welded to one end surface 5 of the separator 1 by projection welding.

However, in the fuel cell stack of Japanese Laid-Open Patent Publication No. 11-339828, the pin shaped voltage measuring terminal 6 protrudes from the end surface 5 of the separator 1. Therefore, at the time of assembling the fuel cell or the fuel cell stack, the voltage measuring terminal 6 is deformed easily. Thus, the quality of the separator 1 lowered, and the number of processes required for the assembling operation is large. In particular, when the separator 1 is thin, the diameter of the voltage measuring terminal 6 is significantly small. The voltage measuring terminal 6 is deformed easily, and may be damaged (broken) undesirably.

SUMMARY OF THE INVENTION

A general object of the present invention is to provide a fuel cell having a simple structure in which the strength of a cell voltage terminal formed integrally with a separator is increased, the desired quality of the cell voltage terminal is maintained, and the number of processes required for assembling operation of the fuel cell is reduced.

According to the present invention, a fuel cell comprises a membrane electrode assembly and separators sandwiching the membrane electrode assembly. The membrane electrode assembly includes a pair of electrodes and an electrolyte membrane interposed between the electrodes. The fuel cell further comprises a cell voltage terminal and a seal member. The cell voltage terminal detects a voltage generated in the membrane electrode assembly, and is formed integrally with an outer region of the separator. The cell voltage terminal extends from the separator outwardly. The seal member is provided on the separator to cover the outer region of the separator. The seal member includes an extension seal which covers the cell voltage terminal to a position near a tip end of the cell voltage terminal.

Further, it is preferable that the extension seal includes a curved portion at a position corresponding to a boundary between the separator and the cell voltage terminal. Further, it is preferable that the separator is a metal plate.

According to the present invention, the cell voltage terminal is formed integrally with the separator. The extension seal of the seal member covers the cell voltage terminal to the position near the tip end of the cell voltage terminal. Though the boundary between the cell voltage terminal and the outer region of the separator is deformed easily, the strength of the boundary is increased by the seal member. Therefore, with the simple structure which is achieved by covering the cell voltage terminal to the position near the tip end of the cell voltage terminal using the seal member, it is possible to prevent the cell voltage terminal from being deformed or damaged (broken). Further, it is possible to improve the sealing performance of the separator. Thus, the desired quality of the metal separator is maintained, and reduction in the number of processes required for assembling the fuel cell can be achieved easily.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
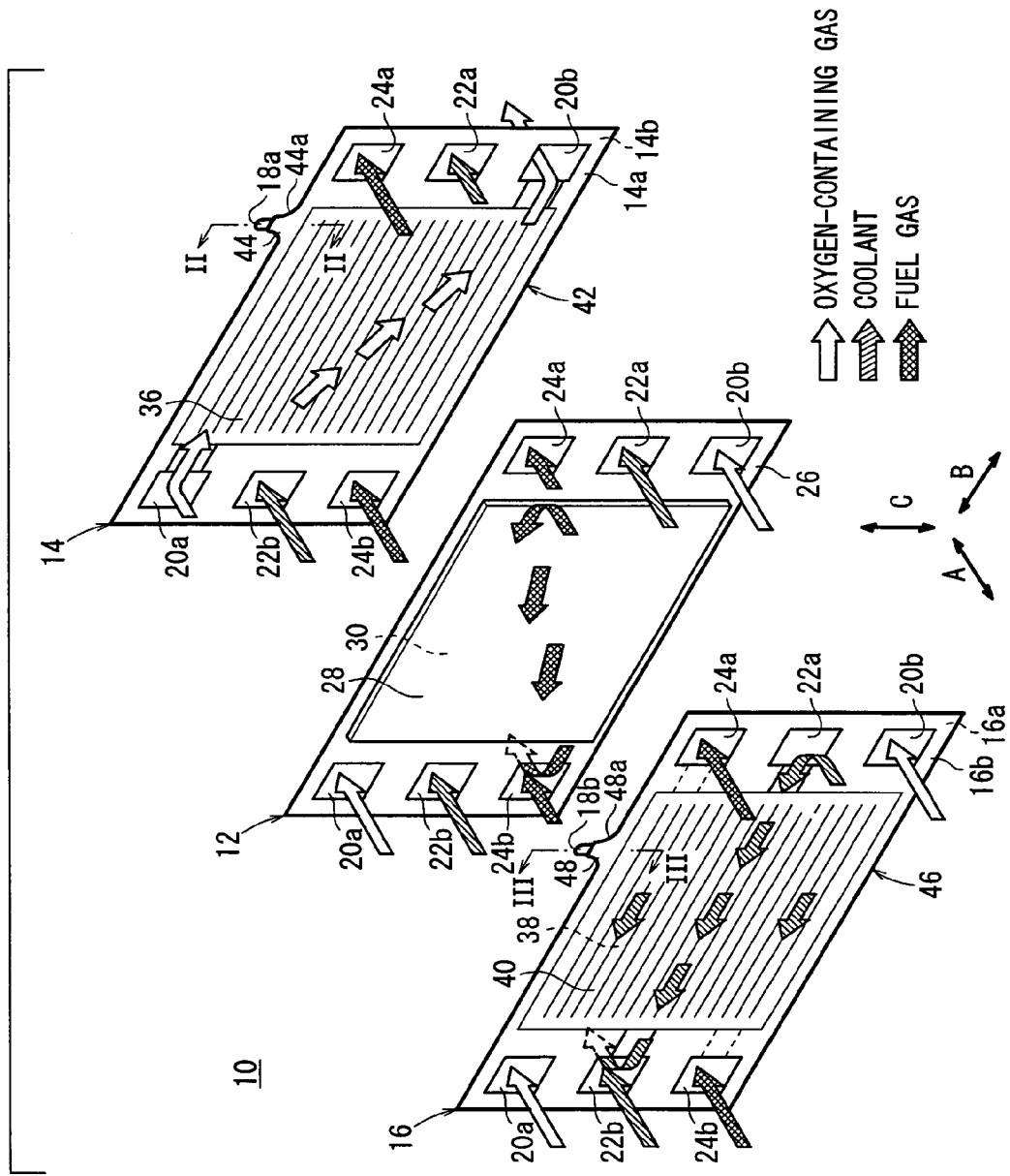
FIG. 1 is an exploded perspective view showing main components of a fuel cell according to an embodiment of the present invention.
Figure 2:
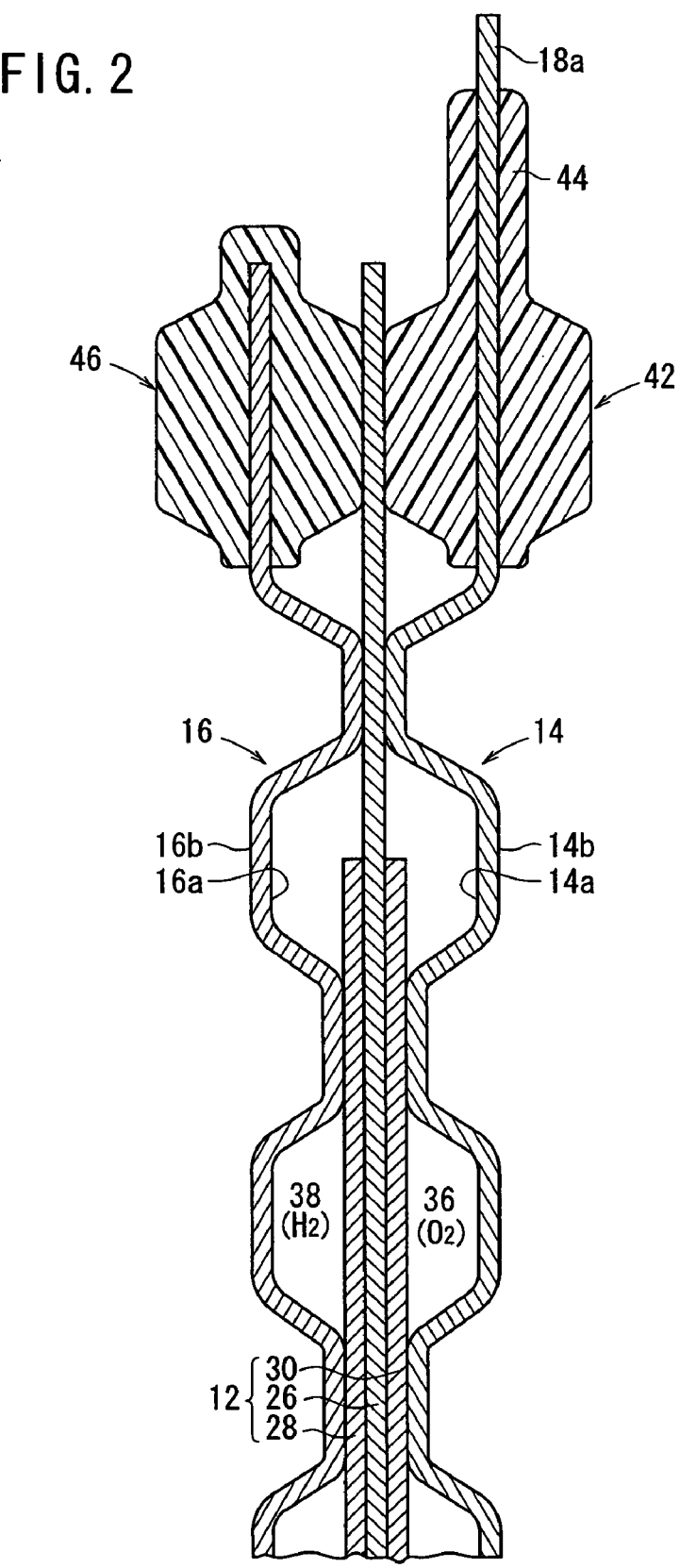
FIG. 2 is a cross sectional view showing the fuel cell, taken along a line II—II in FIG. 1.
Figure 3:
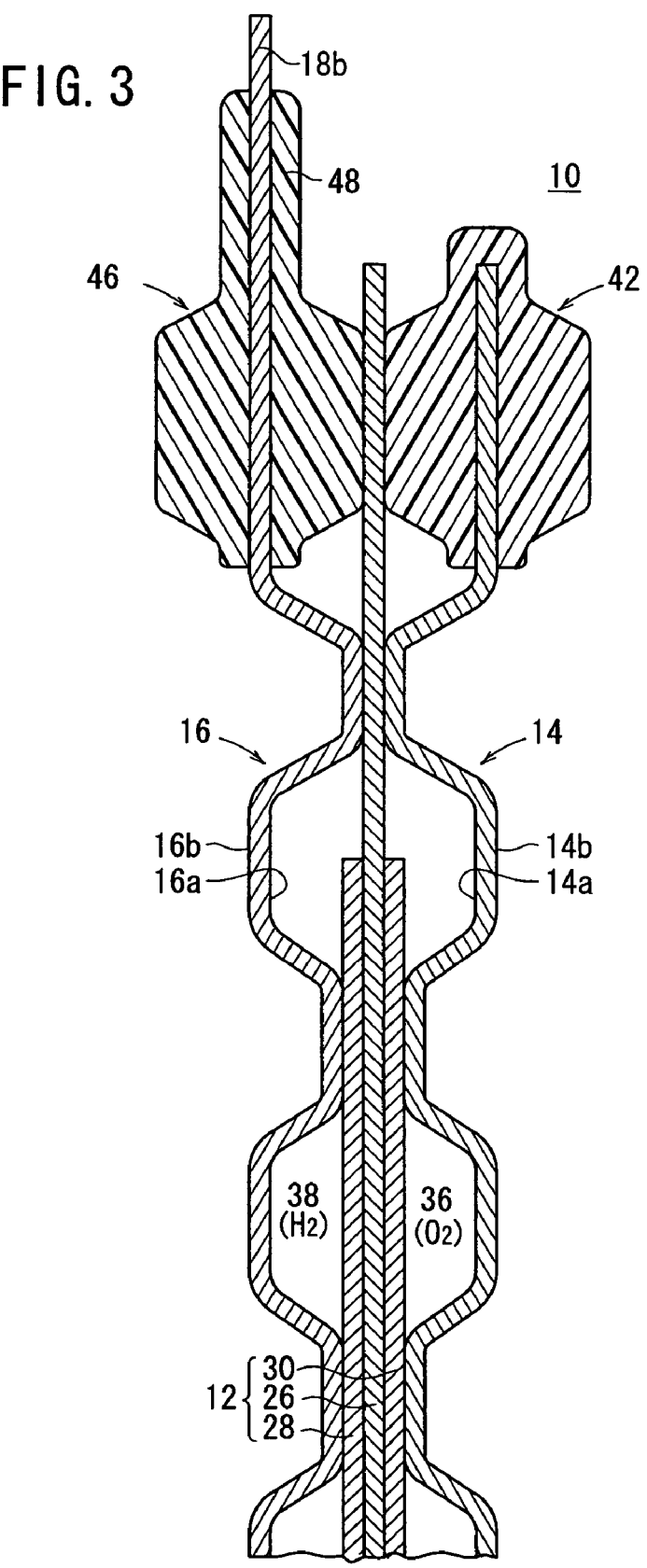
FIG. 3 is a cross sectional view showing the fuel cell, taken along a line III—III in FIG. 1.

FIG. 1 is an exploded perspective view showing main components of a fuel cell 10 according to an embodiment of the present invention. FIG. 2 is a cross sectional view showing the fuel cell 10, taken along a line II—II in FIG. 1. FIG. 3 is a cross sectional view showing the fuel cell 10, taken along a line III—III in FIG. 1.

The fuel cell 10 includes a membrane electrode assembly 12 and first and second metal separators 14, 16 sandwiching the membrane electrode assembly 12. For example, the first and second metal separators 14, 16 are steel plates, stainless steel plates, aluminum plates, plated steel sheets, or metal plates having anti-corrosive surfaces by surface treatment. The first and second metal separators 14, 16 have the thickness in the range of 0.05 mm to 1.0 mm.

First and second cell voltage terminals 18a, 18b are formed integrally with the outer regions of the first and second metal separators 14, 16, at upper positions in the direction indicated by an arrow C. The first and second cell voltage terminals 18a, 18b detect the voltage generated in the membrane electrode assembly 12. The position of the first cell voltage terminal 18a is deviated from the position of the second cell voltage terminal 18b in the direction indicated by an arrow B. Instead of using the first and second metal separators 14, 16, for example, it is possible to use carbon separators.

At one end of the fuel cell 10 in the direction indicated by the arrow B, an oxygen-containing gas supply passage 20a for supplying an oxygen-containing gas, a coolant discharge passage 22b for discharging a coolant, and a fuel gas discharge passage 24b for discharging a fuel gas such as a hydrogen-containing gas are arranged vertically in a direction indicated by the arrow C. The oxygen-containing gas supply passage 20a, the coolant discharge passage 22b, and the fuel gas discharge passage 24b extend through the fuel cell 10 in the stacking direction indicated by the arrow A.

At the other end of the fuel cell 10 in the direction indicated by the arrow B, a fuel gas supply passage 24a for supplying the fuel gas, a coolant supply passage 22a for supplying the coolant, and an oxygen-containing gas discharge passage 20b for discharging the oxygen-containing gas are arranged in the direction indicated by the arrow C.

The membrane electrode assembly 12 includes an anode 28, a cathode 30, and a solid polymer electrolyte membrane 26 interposed between the anode 28 and the cathode 30 (see FIGS. 1 through 3). The solid polymer electrolyte membrane 26 is formed by impregnating a thin membrane of perfluorosulfonic acid with water, for example.

Each of the anode 28 and the cathode 30 has a gas diffusion layer such as a carbon paper, and an electrode catalyst layer of platinum alloy supported on porous carbon particles. The carbon particles are deposited uniformly on the surface of the gas diffusion layer. The electrode catalyst layer of the anode 28 and the electrode catalyst layer of the cathode 30 are fixed to both surfaces of the solid polymer electrolyte membrane 26, respectively.

As shown in FIG. 1, the first metal separator 14 has an oxygen-containing gas flow field 36 on its surface 14a facing the membrane electrode assembly 12. The oxygen-containing gas flow field 36 is connected to the oxygen-containing gas supply passage 20a and the oxygen-containing gas discharge passage 20b. For example, the oxygen-containing gas flow field 36 comprises a plurality of grooves (not shown) extending along the cathode 30 in the direction indicated by the arrow B (see FIGS. 2 and 3).

The second metal separator 16 has a fuel gas flow field 38 on its surface 16a facing the membrane electrode assembly 12. The fuel gas flow field 38 is connected to the fuel gas supply passage 24a and the fuel gas discharge passage 24b. For example, the fuel gas flow field 38 comprises a plurality of grooves extending along the anode 28 in the direction indicated by the arrow B (see FIGS. 2 and 3).

As shown in FIG. 1, a plurality of grooves extending in the direction indicated by the arrow B are formed on a surface 14b of the first metal separator 14 and a plurality of grooves extending in the direction indicated by the arrow B are formed on a surface 16b of the second metal separator 16. When the first metal separator 14 and the second metal separator 16 are stacked together, a coolant flow field 40 is formed between the first and second metal separators 14, 16. The coolant flow field 40 is connected to the coolant supply passage 22a and the coolant discharge passage 22b.

A first seal member 42 is formed integrally on the surfaces 14a, 14b of the first separator 14, e.g., by heat treatment, to cover (sandwich) the outer region of the first separator 14. The first seal member 42 is made of seal material, cushion material or packing material such as EPDM (Ethylene Propylene Diene Monomer), NBR (Nitrile Butadiene Rubber), fluoro rubber, silicone rubber, fluoro silicone rubber, butyl rubber (Isobutene-Isoprene Rubber), natural rubber, styrene rubber, chloroprene rubber, or acrylic rubber.

Figure 4:
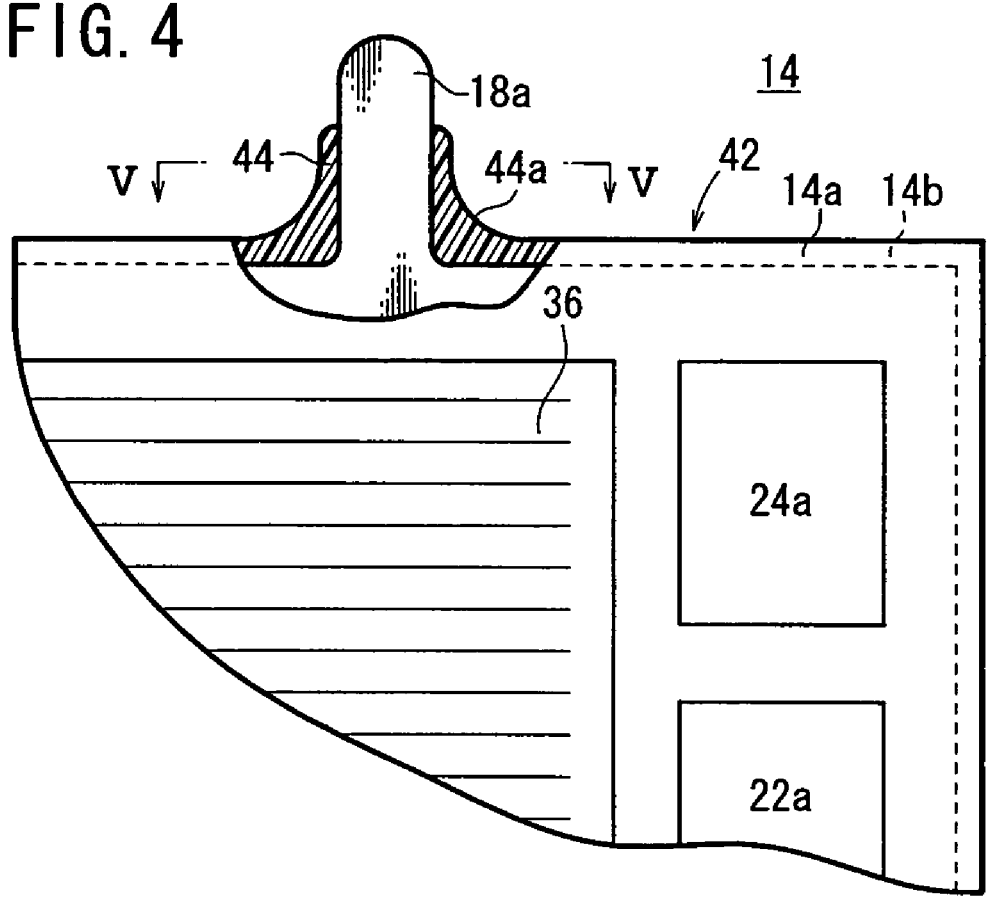
FIG. 4 is a cross sectional front view showing part of a first metal separator of the fuel cell.
Figure 5:
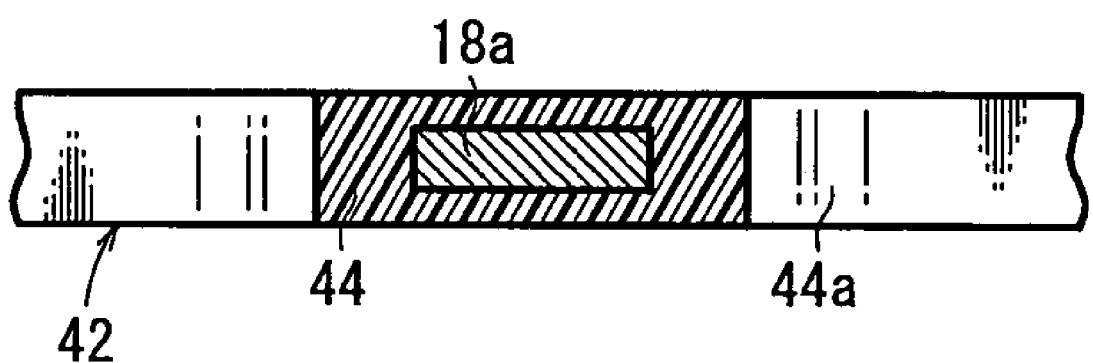
FIG. 5 is a cross sectional view showing the first metal separator, taken along a line V—V in FIG. 4.
Figure 6:
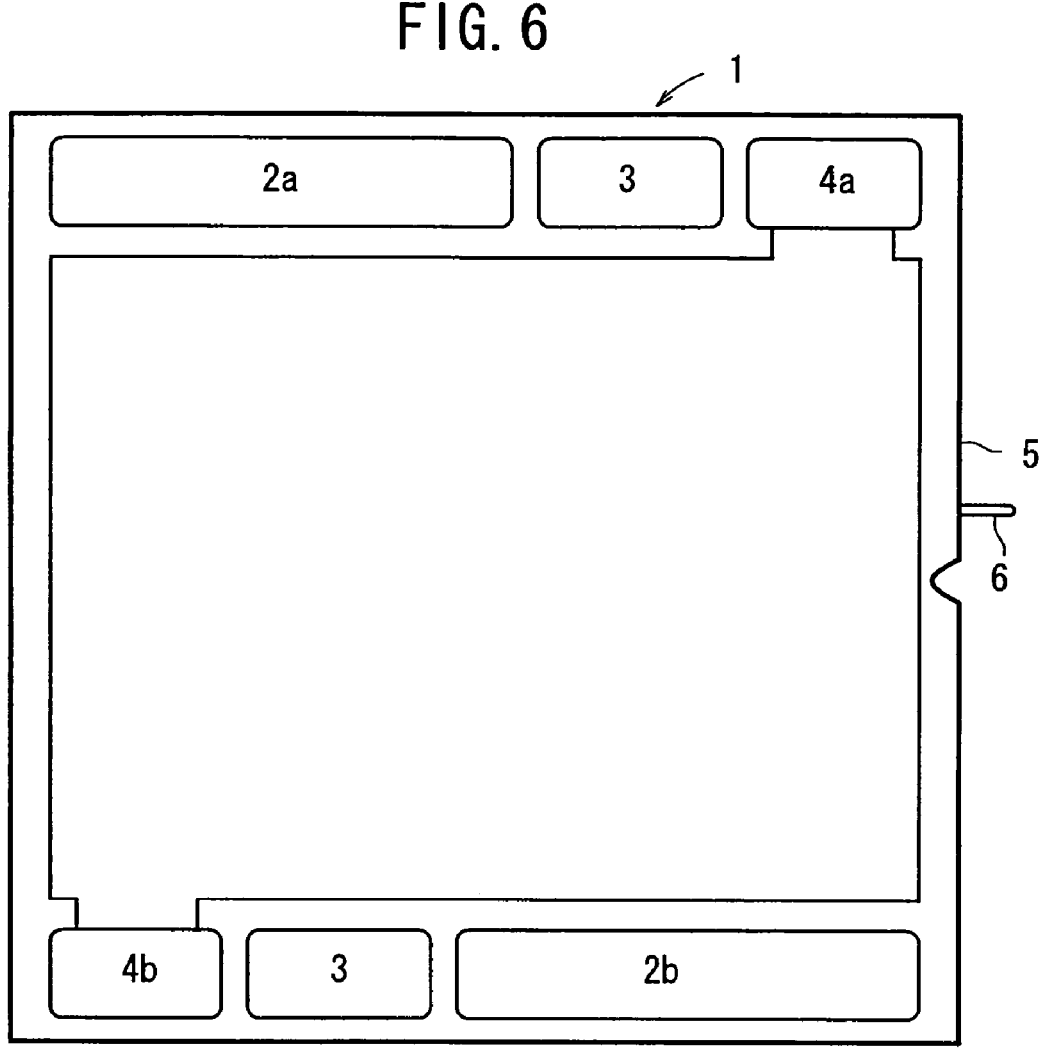
FIG. 6 is a front view showing a conventional separator.

As shown in FIG. 4, the first seal member 42 includes a first extension seal 44 which covers the first cell voltage terminal 18a to a position near a tip end of the first cell voltage terminal 18a (the first extension seal 44 covers the first cell voltage terminal 18a except the tip end of the first cell voltage terminal 18a). As shown in FIG. 5, the first extension seal 44 surrounds the entire circumference of the first cell voltage terminal 18a, and has a curved portion 44a at a position corresponding to a boundary between the first cell voltage terminal 18a and the first metal separator 14 (see FIG. 4).

The first seal member 42 is provided around the oxygen-containing gas flow field 36 on the surface 14a of the first metal separator 14. The first seal member 42 is not provided between the oxygen-containing gas supply passage 20a and the oxygen-containing gas flow field 36, and between the oxygen-containing gas discharge passage 20b and the oxygen-containing gas flow field 36. Thus, the oxygen-containing gas flow field 36 is connected to the oxygen-containing gas supply passage 20a and the oxygen-containing gas discharge passage 20b.

A second seal member 46 is formed integrally on the surfaces 16a, 16b of the second metal separator 16 to cover (sandwich) the outer region of the second metal separator 16. The material used for the second seal member 46 is same as the material used for the first seal member 42.

As shown in FIGS. 1 and 3, the second seal member 46 includes a second extension seal 48 which covers the second cell voltage terminal 18b to a position near a tip end of the second cell voltage terminal 18b (the second extension seal 48 covers the second cell voltage terminal 18b except the tip end of the second cell voltage terminal 18b). The second extension seal 48 has a curved portion 48a at a position corresponding to a boundary between the second cell voltage terminal 18b and the second metal separator 16.

The second seal member 46 is provided around the fuel gas flow field 38 on the surface 16a of the second metal separator 16. The second seal member 46 is not provided between the fuel gas supply passage 24a and the fuel gas flow field 38, and between the fuel gas discharge passage 24b and the fuel gas flow field 38. Thus, the fuel gas flow field 38 is connected to the fuel gas supply passage 24a and the fuel gas discharge passage 24b.

The first seal member 42 is provided around the coolant supply passage 22a, the coolant discharge passage 22b, and the coolant flow field 40 on the surface 14b of the first metal separator 14. The second seal member 46 is provided around the coolant supply passage 22a, the coolant discharge passage 22b, and the coolant flow field 40 on the surface 16b of the second metal separator 16. The first seal member 42 and the second seal member 46 are not provided between the coolant supply passage 22a and the coolant flow field 40, and between the coolant discharge passage 22b and the coolant flow field 40. Thus, the coolant supply passage 22*a* and the coolant discharge passage 22*b* are connected to the coolant flow field 40.

Next, operation of the fuel cell 10 will be described.

Firstly, as shown in FIG. 1, in the fuel cell 10, a fuel gas such as a hydrogen-containing gas is supplied to the fuel gas supply passage n, and an oxygen-containing gas is supplied to the oxygen-containing gas supply passage 20*a*. Further, a coolant such as pure water, or an ethylene glycol is supplied to the coolant supply passage 22*a*.

The fuel gas flows from the fuel gas supply passage 24*a* into the fuel gas flow field 38 of the second metal separator 16. The fuel gas flows along the anode 28 of the membrane electrode assembly 12 for inducing an electrochemical reaction at the anode 28. Likewise, the oxygen-containing gas flows from the oxygen-containing gas supply passage 20*a* into the oxygen-containing gas flow field 36 of the first metal separator 14. The oxygen-containing gas flows along the cathode 30 of the membrane electrode assembly 12 for inducing an electrochemical reaction at the cathode 30.

Thus, in the membrane electrode assembly 12, the fuel gas supplied to the anode 28, and the oxygen-containing gas supplied to the cathode 30 are consumed in the electrochemical reactions at catalyst layers of the anode 28 and the cathode 30 for generating electricity.

Then, after the fuel gas is consumed at the anode 28, the fuel gas is discharged into the fuel gas discharge passage 24*b*, and flows in the direction indicated by the arrow A. Likewise, after the oxygen-containing gas is consumed at the cathode 30, the oxygen-containing gas is discharged into the oxygen-containing gas discharge passage 20*b*, and flows in the direction indicated by the arrow A.

The coolant supplied to the coolant supply passages 22*a* flows into the coolant flow field 40 between the first and second metal separators 14, 16, and flows in the direction indicated by the arrow B. After the coolant cools the membrane electrode assembly 12, the coolant is discharged into the coolant discharge passage 22*b*.

In the embodiment of the present invention, as shown in FIGS. 4 and 5, the first cell voltage terminal 18*a* is formed integrally on the outer region of the first metal separator 14, and the first cell voltage terminal 18*a* protrudes outwardly from the first metal separator 14. The first seal member 42 covers the outer region of the first metal separator 14. The first seal member 42 includes the first extension seal 44 which covers the first cell voltage terminal 18*a* to the position near the tip end of the first cell voltage terminal 18*a*. That is, in the first cell voltage terminal 18*a*, the first seal member 42 covers the boundary between the first cell voltage terminal 18*a* and the outer region of the first metal separator 14 where deformation, damage or the like are likely to occur particularly.

Therefore, the strength of the boundary between the first cell voltage terminal 18*a* and the first metal separator 14 is increased by the first seal member 42. With the simple structure, it is possible to prevent the first cell voltage terminal 18*a* from being deformed or damaged (broken). Further, it is possible to improve the sealing performance of the first metal separator 14. Thus, the desired quality of the first metal separator 14 is maintained, and reduction in the number of processes required for assembling the fuel cell 10 can be achieved easily.

Further, the first extension seal 44 has the curved portion 44*a* at the position corresponding to the boundary between the first cell voltage terminal 18*a* and the first metal separator 14. Thus, the stress is not locally applied to the boundary, and it is possible to prevent the damage at the boundary.

Further, even if the first metal separator 14 is a thin plate having the thickness in the range of 0.05 mm to 1.0 mm, it is possible to reliably prevent the first cell voltage terminal 18*a*, which is a thin plate portion, from being deformed or damaged (broken).

Also in the second metal separator 16, the second seal member 46 includes the second extension seal 48 which covers the second cell voltage terminal 18*b* to the position near the tip end of the second cell voltage terminal 18*b*. Therefore, the same advantages as with the first metal separator 14 can be obtained.

In the embodiment of the present invention, the first and second metal separators 14, 16 have the first and second cell voltage terminals 18*a*, 18*b*. However, the present invention is not limited in this respect. Depending on the structure of a voltage detection device (not shown), for example, only the first metal separator 14 has the first cell voltage terminal 18*a*, and the second metal separator 16 does not have the second cell voltage terminal 18*b*.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A fuel cell comprising a membrane electrode assembly and first and second separators sandwiching said membrane electrode assembly, said membrane electrode assembly including a pair of electrodes and an electrolyte membrane interposed between said electrodes, said fuel cell further comprising:

a first cell voltage terminal for detecting a voltage generated in said membrane electrode assembly formed integrally with an outer region of said first separator, said first cell voltage terminal extending from said first separator outwardly; and a seal member provided on said first separator to cover said outer region of said first separator, said seal member including an extension seal which covers said first cell voltage terminal to a position near a tip end of said first cell voltage terminal.

2. A fuel cell according to claim 1, wherein said extension seal includes a curved portion at a position corresponding to a boundary between said first separator and said first cell voltage terminal.

3. A fuel cell according to claim 1 or 2, wherein said first separator is a metal plate.

4. A fuel cell according to claim 3, wherein said first cell voltage terminal is a thin plate portion extending from said first separator outwardly.

5. A fuel cell according to claim 1 further comprising a second cell voltage terminal formed on said second separator, wherein a position of said first cell voltage terminal is deviated from a position of said second cell voltage terminal in a stacking direction.

* * * * *